United States Patent [19]
Rusterholz

[11] Patent Number: 5,634,113
[45] Date of Patent: May 27, 1997

[54] METHOD FOR GENERATING A PREFERRED PROCESSING ORDER AND FOR DETECTING CYCLES IN A DIRECTED GRAPH USED TO REPRESENT SYSTEM COMPONENT CONNECTIVITY

[75] Inventor: John T. Rusterholz, Roseville, Minn.

[73] Assignee: Unisys Corporation, Blue Bell, Pa.

[21] Appl. No.: 354,336

[22] Filed: Dec. 13, 1994

[51] Int. Cl.$^6$ ................................................ G06F 17/00
[52] U.S. Cl. ......................... 395/500; 364/488; 364/489; 364/490; 364/491
[58] Field of Search ........................ 364/488, 489, 364/200, 576; 395/500, 708

[56] References Cited

U.S. PATENT DOCUMENTS

| | | | |
|---|---|---|---|
| 3,579,194 | 5/1971 | Weinblatt | 340/172.5 |
| 4,953,106 | 8/1990 | Gansner et al. | 364/521 |
| 5,187,785 | 2/1993 | Shah | 395/575 |
| 5,195,172 | 3/1993 | Ehad et al. | 395/50 |
| 5,200,888 | 4/1993 | Hashimoto | 364/400 |
| 5,201,046 | 4/1993 | Goldberg et al. | 395/600 |
| 5,251,290 | 10/1993 | Pabon | 395/120 |
| 5,394,556 | 2/1995 | Oprescu | 395/800 |
| 5,450,535 | 9/1995 | North | 395/140 |

OTHER PUBLICATIONS

"Introduction to Algorithms" Cormen, Leiserson & Rivest Chapter 23, pp. 465–497, 1991 (Third Printing) QA76.6.C662.

Chachra, Vinod. "Applications of Graph Theory Algorithms", 1979, Elsevier North Holland, Inc., pp. 4–20.

Primary Examiner—Kevin J. Teska
Assistant Examiner—A. Roberts
Attorney, Agent, or Firm—Charles A. Johnson; Mark T. Starr

[57] ABSTRACT

A method used by a digital computer for generating a preferred processing order of the vertices in a directed graph. The method also detects any cycles that exist in the directed graph. The vertices of the directed graph represent components of a system and the arcs represent the interrelationships between components. Each arc is defined by a vertex pair consisting of a starting vertex and an ending vertex. Each vertex is either assigned or unassigned to a processing order and marked as either a leaf vertex or a non-leaf vertex. The method includes traversing the set of arcs of the directed graph and marking the starting vertex as a non-leaf vertex for each arc whose ending vertex is unassigned, traversing the set of vertices and for each vertex that is unassigned and a leaf vertex, assigning the vertex to the processing order; and for each vertex that is unassigned and a non-leaf vertex, marking it as a leaf vertex. If unassigned vertices remain in the set of vertices and no vertices were assigned to the processing order then a cycle exists in the directed graph. These steps are repeated as long as there are vertices in the set of vertices that are unassigned and no cycle has been detected.

23 Claims, 7 Drawing Sheets

| FROM | TO |
|---|---|
| 2 | 11 |
| 10 | 4 |
| 6 | 8 |
| 6 | 9 |
| 4 | 0 |
| 8 | 0 |
| 8 | 3 |
| 9 | 3 |
| 9 | 5 |
| 0 | 1 |
| 3 | 7 |
| 1 | 7 |
| 10 | 7 |

FIG. 7A

| VERTEX ID | INITIAL | PASS 1A | PASS 2A | PASS 3A | PASS 4A | PASS 5A |
|---|---|---|---|---|---|---|
| 0 | 1 | 0 | 0 | 1 | 1 | 1 |
| 1 | 1 | 0 | 1 | 1 | 1 | 1 |
| 2 | 1 | 0 | 1 | 1 | 1 | 1 |
| 3 | 1 | 0 | 1 | 1 | 1 | 1 |
| 4 | 1 | 0 | 0 | 0 | 1 | 1 |
| 5 | 1 | 1 | 1 | 1 | 1 | 1 |
| 6 | 1 | 0 | 0 | 0 | 0 | 1 |
| 7 | 1 | 1 | 1 | 1 | 1 | 1 |
| 8 | 1 | 0 | 0 | 0 | 1 | 1 |
| 9 | 1 | 0 | 0 | 1 | 1 | 1 |
| 10 | 1 | 0 | 0 | 0 | 0 | 1 |
| 11 | 1 | 1 | 1 | 1 | 1 | 1 |

FIG. 7B

| 0 | 1 | 2 | 3 | 4 | 5 | 6 | 7 | 8 | 9 | 10 | 11 |
|---|---|---|---|---|---|---|---|---|---|---|---|
| 5 | 7 | 11 | 1 | 2 | 3 | 0 | 9 | 4 | 8 | 6 | 10 |

FIG. 6

| VERTEX ID | INITIAL | PASS 1 | PASS 2 | PASS 3 | PASS 4 | PASS 5 |
|---|---|---|---|---|---|---|
| 0 | 0 | 0 | 0 | 7 | 7 | 7 |
| 1 | 0 | 0 | 4 | 4 | 4 | 4 |
| 2 | 0 | 0 | 5 | 5 | 5 | 5 |
| 3 | 0 | 0 | 6 | 6 | 6 | 6 |
| 4 | 0 | 0 | 0 | 0 | 9 | 9 |
| 5 | 0 | 1 | 1 | 1 | 1 | 1 |
| 6 | 0 | 0 | 0 | 0 | 0 | 11 |
| 7 | 0 | 2 | 2 | 2 | 2 | 2 |
| 8 | 0 | 0 | 0 | 0 | 10 | 10 |
| 9 | 0 | 0 | 0 | 8 | 8 | 8 |
| 10 | 0 | 0 | 0 | 0 | 0 | 12 |
| 11 | 0 | 3 | 3 | 3 | 3 | 3 |

METHOD FOR GENERATING A PREFERRED PROCESSING ORDER AND FOR DETECTING CYCLES IN A DIRECTED GRAPH USED TO REPRESENT SYSTEM COMPONENT CONNECTIVITY

BACKGROUND OF THE INVENTION

1. Field of the Invention

This invention relates generally to methods of processing directed graphs within a computer system, wherein the vertices represent electrical components of a system and the arcs represent physical or logical relationships between the components. The invention is more specifically related to a method for generating a preferred order for processing the vertices of a directed graph for use by Computer Aided Engineering (CAE) simulation tools and for detecting cycles in a directed graph.

2. Background Information

In recent years, many advanced Computer Aided Engineering (CAE) analysis and simulation tools have been developed to facilitate the design of Very Large Scale Integrated (VLSI) circuits. The goals of applying these CAE tools include improving product quality, improving product safety, reducing engineering time by needing fewer design iterations, reducing the number of prototypes or possibly eliminating the need for prototypes, and reducing product cost.

It is axiomatic that engineering analyses can be used to evaluate and predict the behavior of new designs. Historically, engineers analyzed designs by performing calculations by hand or with a computing aid such as a electronic calculator. They frequently used tabulated mathematical functions, approximation methods, and data accumulated from previous experience and physical testing to simplify their analyses. Some analyses were so time-consuming that, when done at all, they could only be completed for simple systems. This frequently led to under- and overdesigned systems. In the first case, this created systems that did not work properly, failed outright, or were physically impossible to build. In the second case, the systems were more expensive than necessary or did not meet their performance requirements.

The advent of advanced computer-based logic design tools solved these problems by allowing a system designer to easily specify a complex electronic system, via a language such as Very High Speed Integrated Circuits Hardware Description Language (VHDL), by selecting its electrical components from a standard-parts library of electrical components and by connecting the components together to form the desired electronic system or device. The CAE libraries include standard electrical components, their physical characteristics, performance criteria, and specifications. The use of these standard-parts libraries in conjunction with CAE tools greatly simplifies the process of setting up a simulation or other analysis of the system design. Modern CAE tools allow design engineers to analyze, evaluate, and verify the functionality and physical characteristics of a design for a circuit board, VLSI chip, or other electrical or electronic device before it is committed to manufacturing. In some cases, the CAE simulation supplants altogether the building of a prototype. Available analyses include gate level, switching, electrical level, analog-to-digital conversion, worst case statistical, and sensitivity-base simulations. Partly as a result of using such tools, the density and complexity of many systems has risen dramatically. Many system designs contain hundreds of thousands of electrical components with their accompanying connections perhaps numbering in the millions. Obviously, testing and verification of these complex system designs are daunting tasks for human beings, and computerized methods must be as efficient as possible so as to minimize the time needed to verify a design.

Various models are typically used by the CAE tools to represent the components of the system being designed, their interrelationships, and their characteristics. Hierarchical representation of components in a model implemented by the CAE tool provides multiple levels of logical abstraction of the system and hence is a preferred methodology for use in complex system design. However, it is usually difficult to derive information about the system from the different levels of the model. Consequently, redundant representations of electrical components may exist. One potential problem with a complex system design as specified by the various design engineers using the CAE tool may be that the entire system physically cannot be manufactured as designed. This situation could arise if one design engineer has specified a particular component to be a part of the system at a particular level of abstraction of the system hierarchy, and the same or another logic designer working on the system specifies the same component to be a part of the system at a lower level of the system hierarchy, such that the second instance of the component is logically contained (and subsequently physically contained) within the first instance of the component. This design error may result in the attempted manufacture of a system that does not work and actually cannot physically be built. This logical inconsistency may be easily detected for simple system designs, but when the number of components grows very large, the difficulty in detecting errors increases exponentially.

The model of the system components, their interrelationships and characteristics, are commonly represented in a CAE tool being executed by a computer system as a directed graph. A graph is a non-empty but finite set of edges that join pairs of distinct vertices. A directed graph is obtained if direction is added to each edge of a graph. The edges form a finite set of ordered pairs of distinct vertices. For directed graphs, these edges are usually called arcs. Graphs are used extensively to represent the structure of a system. Graphs are simple abstractions of reality, and are useful in enhancing the understanding of complex systems. The vertices usually represent objects of some kind (such as electrical components) and the arcs represent connections of a physical or logical nature between the vertices (such as the inclusion of one component by another). A useful representation of the set of arcs defining a directed graph is called an adjacency list. An arc sequence with distinct arcs is called a path. A path in which all vertices are distinct is called a simple path. A closed path, that is, a path having the first vegex equal to the last vertex, in the arc sequence is called a cycle. A directed acyclic graph is a directed graph that has no cycles. A directed acyclic graph is called a tree if it has a unique vertex (the root), which no arcs enter, every other vertex has exactly one arc entering it, and there is a unique path from the root to any vertex.

It is important to determine if a directed graph representing a complex system has a cycle. If the vertices of a directed graph represent hardware components such as registers, multiplexors, arithmetic logic units (ALUs), gates, flip-flops, etc., and the arcs of the directed graph represent the physical inclusion of one component into another, the existence of a cycle is evidence of a physical impossibility in the design. Detecting this situation early in the design cycle reduces the cost of fixing the problem at the testing stage, or worse yet, during the manufacturing process. Detecting a cycle in a directed graph and determining a preferred processing order of the vertices of the graph are common problems and there are many possible solutions. Most solutions, however, require that the vertices be connected to their arcs in the data structures used to represent the vertices and arcs in the CAE tool, that the vertices or arcs be sorted in a particular order, or involve time consuming searches through the data structures. Such existing solutions typically have computational complexities of O(n**2), where n is the number of arcs. Therefore, as the number of arcs and vertices grows large, the processing time for implementation of these solutions grows exponentially. Of course, when a complex system is being designed that has an extremely large number of components and the computational complexity of the simulation is exponential, the processing time required may become prohibitive. In that case, validation of the system design is not completed at the risk of having a fatal defect in the design being discovered on the manufacturing floor. A method for detecting cycles in a directed graph that has a linear computational complexity of O(n) is highly desirable in that it substantially and dramatically reduces the processing time needed to analyze and validate a large, complex system design. The present invention delivers the performance benefits from achieving this linear computational complexity for simulating complex system designs.

SUMMARY OF THE INVENTION

An object of this invention is to minimize the processing time required to analyze a directed graph used to represent the components of a complex system.

An object of this invention is to generate a preferred processing order for the vertices of a directed graph used to represent the connectivity of components in a system.

Another object of this invention is to detect a cycle in a directed graph used represent the connectivity of components in a system.

A further object of this invention is to generate a preferred processing order of vertices and detect any cycles in a directed graph used to represent the connectivity of components in a system, whereby the computational complexity of steps performed is bounded by O(n), where n is the number of arcs, arcs being the logical connection between arcs.

Yet a further object of this invention is to generate a preferred processing order of vertices and detect any cycles in a directed graph used to represent the connectivity of components in a system, whereby the number of processing passes through the arcs of the directed graph is bounded by the maximum path length of the directed graph.

Still another object of this invention is to generate a processing order for the vertices in a directed graph such that each vertex is processed before any of its parents.

Yet another object of this invention is to generate a preferred processing order of vertices and detect any cycles in a directed graph used to represent the connectivity of components in a system, given only the number of vertices, the number of arcs, and an adjacency list defining directed arcs connecting pairs of vertices; the elements on the adjacency list being in random order.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended Claims.

According to the present invention, the foregoing and other objects and advantages are attained by a method for generating a processing order and for detecting cycles in a directed graph having a set of vertices and a set of arcs. Each arc in the directed graph is defined by a starting vertex and an ending vertex. Each vertex is either assigned or unassigned to a processing order and marked as either a leaf vertex or a non-leaf vertex. The method comprises the steps of traversing the set of arcs and marking the starting vertex as a non-leaf vertex for each arc whose ending vertex is unassigned to the processing order, traversing the set of vertices and for each vertex that is unassigned to the processing order and marked as a leaf vertex, assigning the vertex to the processing order, and for each vertex that is unassigned to the processing order and marked as a non-leaf vertex, marking the vertex as a leaf vertex, and indicating that a cycle exists in the directed graph when there are unassigned vertices remaining in the set of vertices and no vertices were assigned to the processing order during the current iteration of the previous two steps. These steps are repeated if there are vertices in the set of vertices that are unassigned to the processing order and no cycle was indicated.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIG. 6 is a table illustrating changes in the contents of the Position array during the processing of the directed graph of FIG. 5A according to the present invention.

FIG. 7A is a table illustrating changes in the contents of the Leaf array during the processing of the directed graph of FIG. 5A according to the present invention.

FIG. 7B is a table illustrating the preferred processing order of the directed graph of FIG. 5A produced by the present invention.

DESCRIPTION OF THE PREFERRED EMBODIMENT

Figure 1:
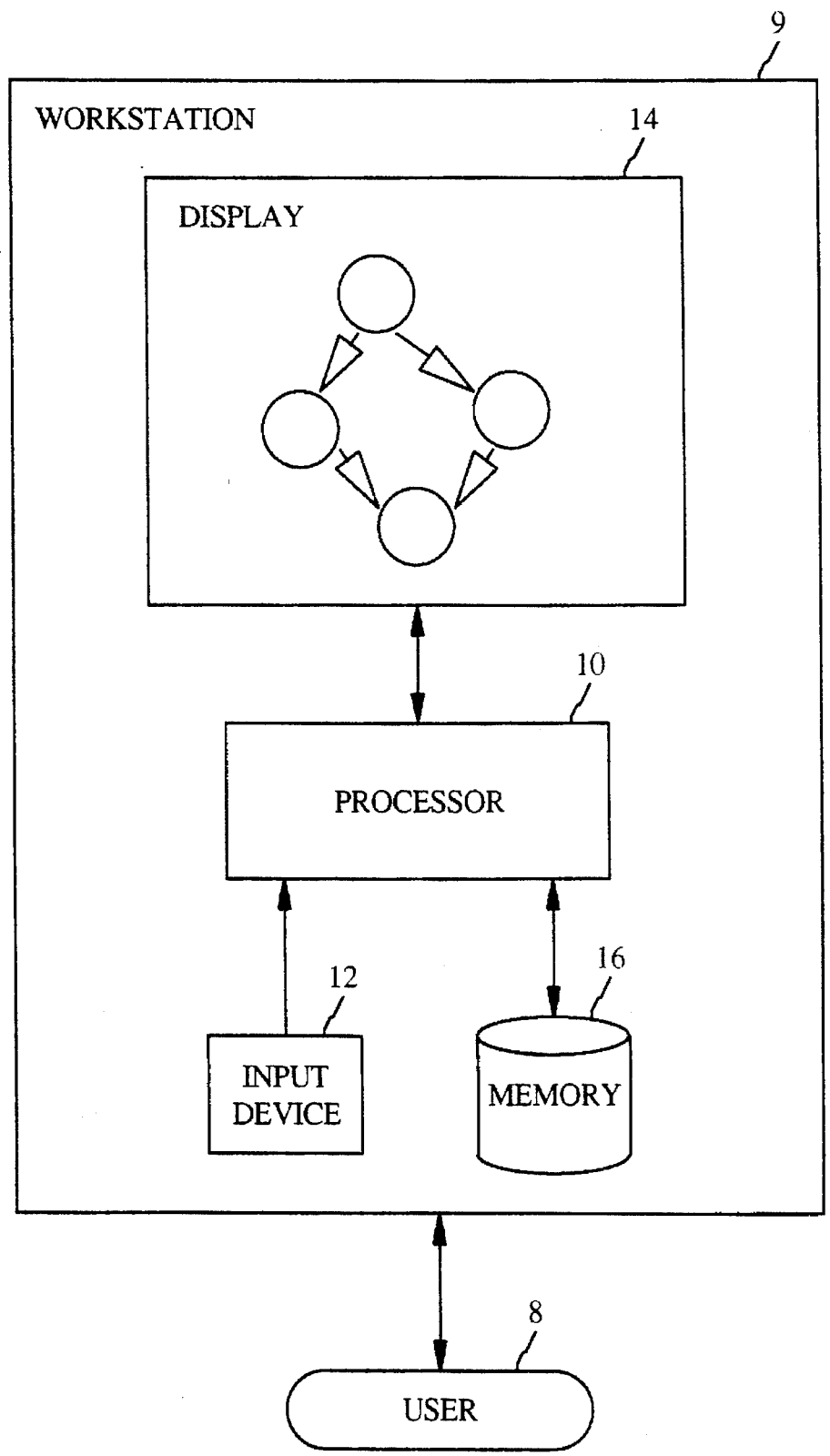
FIG. 1 is a block diagram of the processing environment of the present invention.

The present invention preferably is implemented for practice by a computer, e.g., a source code expression of the present invention is input to the computer to control operations therein. Enclosed herein is an illustrative example of an embodiment of the present invention written in the C programming language. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons. In addition, the present invention has broad applicability to all applications where a directed graph may be used to represent objects and their interrelationships. It is not intended that the present invention be limited to the field of CAE tools and their representation of logic modules.

The problem to be solved by the present invention originated with a requirement to quickly "levelize" a design hierarchy of logic modules such that any recursion is readily detected. The problem can be stated as follows: given a directed graph consisting of a set of vertices and a set of arcs between pairs of vertices, determine the existence of any cycle in the directed graph, and, in the absence of a cycle, determine an order for processing the vertices such that each vertex is processed before any of its parents. The vertices in the set of vertices and arcs in the set of arcs can be supplied in random order; that is, no inherent relationship can be derived from the placement of the vertices or the arcs in the directed graph data structures. There is not necessarily one root vertex for the directed graph, and working sets of the directed graph may consist of different, disjoint parts of the overall graph structure. It should be understood that the directed graph used in the present invention is not necessarily a binary graph (that is, the connections between vertices can represent a "many-to-many" relationship). In addition, there is initially no connection from a vertex to either of its incoming or outgoing arcs.

Inputs to the method of the present invention include the number of vertices in the directed graph, the number of arcs, and an adjacency list. In the preferred embodiment, the vertices are identified by integers from zero to the number of vertices minus one. Alternatively, other schemes for labeling vertices may be used. The adjacency list consists of a set of arcs, wherein each arc is defined by an ordered pair of vertex numbers. The method produces a flag indicating whether a cycle has been found in the directed graph and an integer array containing the vertex numbers in a desired sequence. Generally, the method operates by making alternate traversals of the arc set and the vertex set. Each traversal identifies those vertices that are leaves (i.e., vertices having no outgoing arcs). The identified vertices are assigned positions in the resulting position array, and removed from further consideration. When all vertices have been so assigned, the method is complete. In the absence of a cycle, the number of traversals is bounded by the depth of the directed graph (i.e., the length of the longest path). A cycle (recursion) is detected by noticing whether each traversal results in one or more vertices being assigned positions in the position array. If any traversal produces no new vertices to assign, and there are some unassigned vertices remaining to be processed, then a cycle exists in the directed graph. This error is returned to the calling process.

The method of the present invention is typically implemented as a software subroutine. The number of arcs, number of vertices, and the adjacency list are supplied by the caller of the subroutine. It is not necessary for the caller to supply the list of vertices. However, the caller usually supplies the memory space for writing the output list of vertices. The subroutine uses two arrays with the number of elements in each array being equal to the number of vertices. One array holds the processing position of the vertices, the other array holds flags indicating whether the vertices are leaf vertices of the directed graph. For each vertex, the corresponding Position array entry indicates the position of that vertex in the final output, or contains a flag indicating that it is 'unassigned'. Initially, all vertices in the Position array are marked as 'unassigned'. As the method is performed, 'unassigned' indications are replaced with 'assigned' indications. For each vertex, the corresponding Leaf array entry has one bit indicating whether or not the vertex is a leaf on the current pass through the algorithm.

Three variables are used to hold control flags and values. The New flag is true if and only if the current pass of the algorithm has located a leaf vertex that was not a leaf vertex on previous passes. The More_Vertices flag is true if and only if there remain unassigned nodes. The Count variable contains the next position number to be assigned.

The method of the present invention is summarized in the pseudo-code fragment shown below in Table I.

TABLE I

Initialize Count to the first entry in the Position array.
Allocate the Position array with a length of Number_Of_Vertices.
Initialize the Position array to all 'unassigned'.
Initialize the Leaf array to all leaves.
While there are unassigned vertices do:

A
--> For every arc whose 'to' vertex is unassigned
    Set the 'from' vertex to be non-leaf.
--> End For.

B
--> For every vertex that is unassigned
    If the vertex is now marked as a leaf,
        Then set the New flag to indicate a vertex has been
            assigned this pass,
            Assign the vertex's Position entry to be Count,
            Increment Count.
        Else set the More_Vertices flag to indicate there
            remain unassigned vertices,
            Re-initialize the leaf flag for this vertex.
    End If.
--> End For.

If there remain unassigned vertices but none were assigned
        this pass,
        Then cycle exists in directed graph,
            Return error to the caller.
    End If.
End While.
Construct the Order array from the Position array.
Return the Order array to the caller.

Referring now to the drawings, FIG. 1 is a block diagram illustrating the processing environment of the present invention. In the preferred embodiment, a User 8 interacts with in an engineering Workstation 9. The Workstation may be a computer system such as is commercially available from Hewlett-Packard Corporation, Sun Microsystems, Inc., and others. The Processor 10 receives input from a user, via the Input Device 12, directing the Processor to add, delete, or otherwise modify vertices and arcs of a directed graph shown on the Display 14. The Processor 10 executes logic simulation or other appropriate application programs, including CAE tools. The Memory 16 stores the intermediate and final versions of the data structures used to represent the directed graph being manipulated by the user. It is understood that Processor 10 can comprise any well known computer or microprocessor, and that the combination of the Display 14, Processor 10, Memory 15, and Input Device 12 represents any one of a variety of computer systems well known in the computing art, including those known as engineering work stations.

Figure 2:
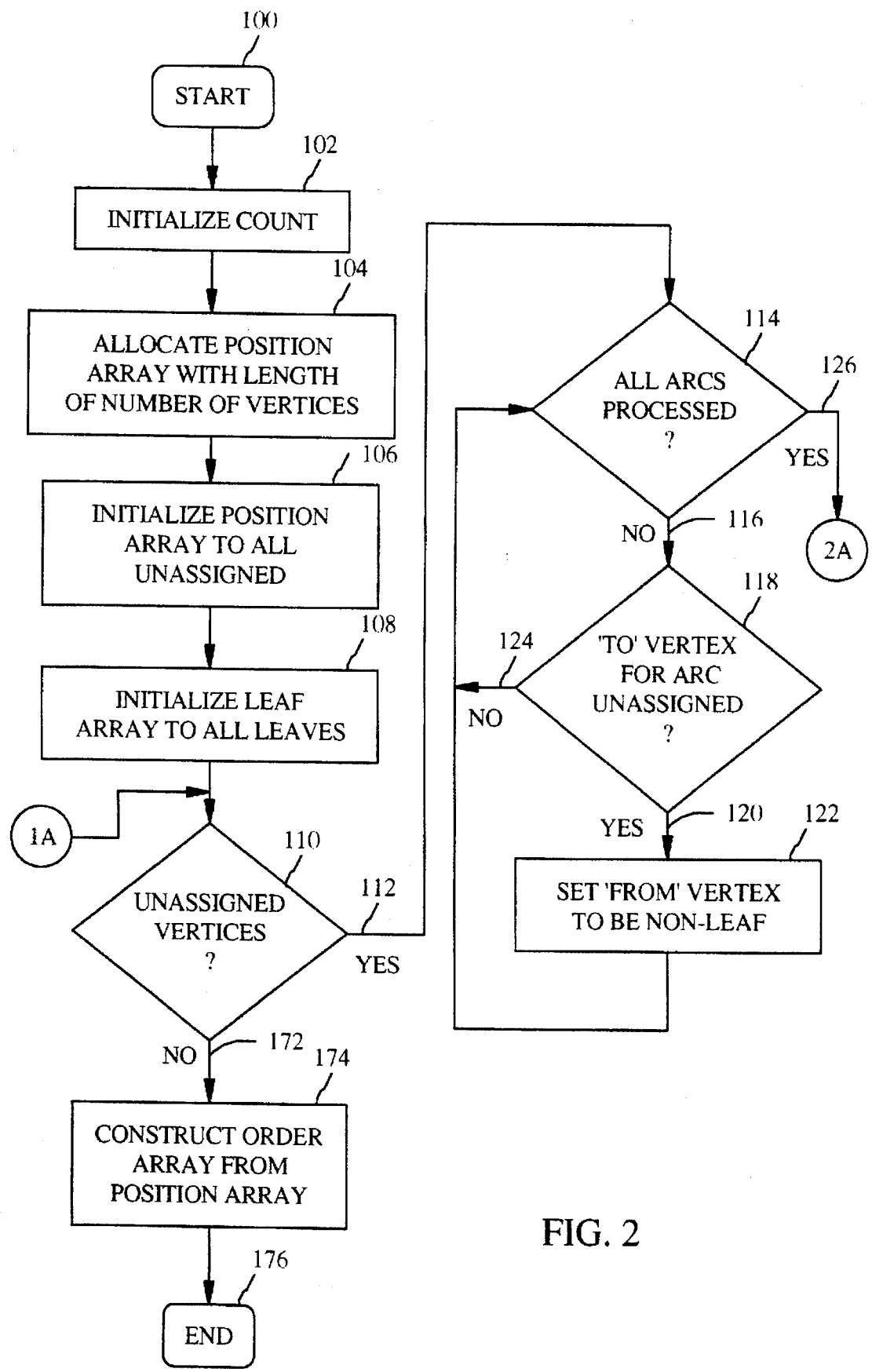
FIG. 2 and FIG. 3 are flow charts illustrating the steps for determining processing order and detecting cycles according to the present invention.

FIG. 2 is a flow chart illustrating the steps for determining processing order and detecting cycles according to the present invention. After Start Step 100, the Count variable is initialized to zero at Step 102. At Step 104, storage for the Position array is allocated, with the number of entries in the array being equal to the number of vertices. All entries in the Position array are then initialized to 'unassigned' at Step 106. At Step 108, all entries in the Leaf array are initialized to 'leaves'. In the preferred embodiment, storage for the Leaf array does not need to be allocated because the Leaf array uses the storage allocated for the Order array. This storage saving technique may be used because the Order array is available and it is known that it is the correct size. If there are unassigned vertices to be processed (Test Step 110), then Yes path 112 is taken to Test Step 114. All arcs in the adjacency list are to be traversed to update the Leaf array. At Step 114, if all arcs have not yet been processed, then No path 116 is taken to Test Step 118. If the 'to' vertex for the current arc is 'unassigned' (that is, the arc is to an unassigned vertex), then the Yes path 120 is taken to Step 122. At this Step, the 'from' vertex for the current arc is set to 'non-leaf' in the Leaf array. Processing continues at Test Step 114 with the next arc in the adjacency list. If the 'to' vertex for the current arc is already assigned, then No path 124 is taken back to Test Step 114 for consideration of the next arc in the adjacency list. When all arcs in the adjacency list have been processed, Yes path 126 is taken to FIG. 2 via connector 2A.

Figure 3:
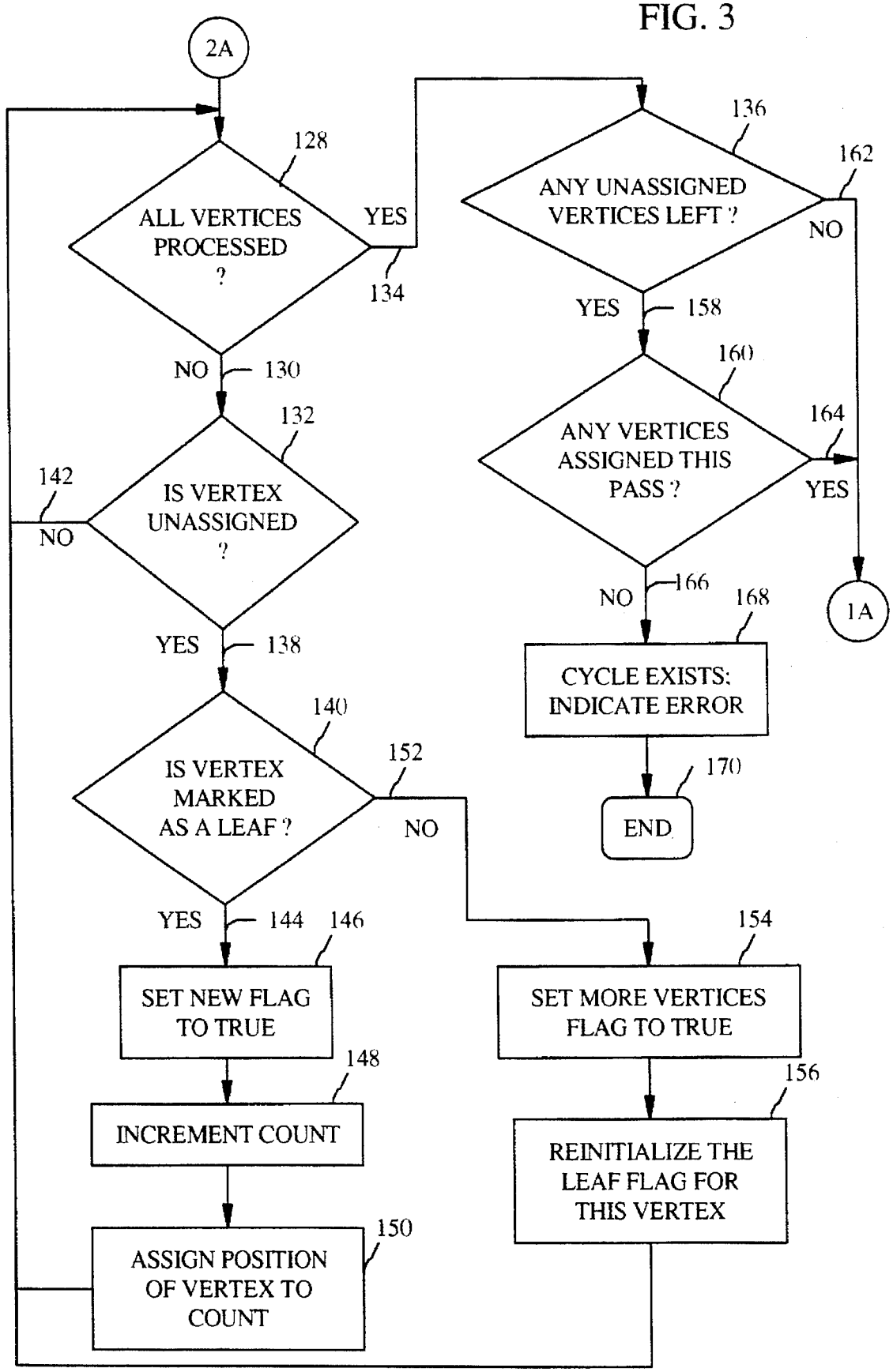

FIG. 3 is a flow chart illustrating additional steps for determining processing order and detecting cycles according to the present invention. All vertices are to be traversed to process any newly identified leaves that exist in the directed graph. At Test Step 128, if all vertices have not been processed yet, No path 130 is taken to Test Step 132. If all vertices have been processed, Yes path 134 is taken to Test Step 136. If, at Test Step 132, the current vertex is unassigned, Yes path 138 is taken to Test Step 140. If the current vertex has already been assigned, then No path 142 is taken back to Test Step 128, where the next vertex is selected for processing if, at Test Step 140, the current vertex is marked as a leaf, Yes path 144 is taken to Step 146. Here, the New flag is set to true. At Step 148, the Count variable is incremented. At Step 150, the entry in the Position array corresponding to the current vertex is set to the value of the Count variable. Processing then continues with the next vertex selected for processing at Test Step 128. If, at Test Step 140, the current vertex is not marked as a leaf, then No path 152 is taken to Step 154. At this Step, the More_Vertices flag is set to true. Next, at Step 156, the entry in the Leaf array for the current vertex is set to indicate that the vertex is a leaf. Processing continues with the next vertex selected for processing at Test Step 128.

If all vertices have been processed as determined by Test Step 128, then Test Step 136 is performed. If any unassigned vertices are left to process (i.e. More_Vertices is true), Yes path 158 is taken to Test Step 160. Otherwise, No path 162 is taken back to Test Step 110 on FIG. 2 via connector 1A. If any vertices were assigned in this pass through the vertices (i.e., New is true), then Yes path 164 is taken and processing continues with Test Step 110 on FIG. 2 via connector 1A. If, however, no vertices were assigned on this pass, then No path 166 is taken to Step 168. At this step it can be concluded that a cycle exists in the directed graph, therefore an error is indicated and returned to the calling software module. Processing then ends at Step 170.

If processing continued via connector 1A to FIG. 2, the check for unassigned vertices is performed anew at Test Step 110. If there are no unassigned vertices, then no cycle has been detected in the directed graph. Thus, No path 172 is taken to Step 174, where the Order array is constructed from the Position array. The Order array is used to return the processing order of the vertices to the caller. Processing then ends at End Step 176.

The following table shows the currently contemplated best mode of the present invention as coded in the C language.

TABLE II

```
© 1994 Unisys Corporation
int fast_levelize(
    int *order,              /* return processing order here */
    int number_of_arcs,      /* number of arcs */
    int number_of_vertices   /* number of vertices */
    arc_t *adjacency_list    /* adjacency list holding arc information */
/* Accepts input from the array 'adjacency list', which consists of pairs of vertices */
/* designated by 'from' and 'to' fields. The 'from' and 'to' are integers less than */
/* 'number_of_vertices'. The algorithm performs levelization, and returns the result */
/* in the array 'order' such that if one processes the vertices sequentially by order[0], */
/* order[1], order[2], ..., the effect will be to proceed UP the directed graph. */
/* This algorithm checks for recursion, and returns a 1 if recursion (i.e., a cycle) is */
/* present. It returns a 0 if no recursion is present. It returns a 2 if it fails to allocate */
/* the Position array. */
{ int *position;
  int *leaf;
  int index, more_vertices, new;
  int count = 0;
            /* allocate the position array */
  position = malloc(number_of_vertices * sizeof(*position));
  if (!position) {printf("**Cannot malloc position array "); return(2);}
  for (index = 0, index < number_of_vertices, index++)
```

TABLE II-continued

```
        { position[index] = 0;          /* initialize the position array to 'unassigned' */
          leaf[index] = 1;              /* initialize the leaf array to all leaves */
        }
  more_vertices = number_of_vertices > 0;  /* safeguard against null input */
  while (more_vertices)
    /* traverse arcs to update leaf array */ /* NOTE 1 */
    { for (index = 0; index < number_of_arcs; index++)
        {(if (position[adjacency_list[index].to] = 0) /* if arc is to an unassigned vertex */
            leaf[adjacency_list[index].from] = 0; /* then 'from' is not a leaf */
        }
      more_vertices = 0;                /* set up to look for new status */
      new = 0;                          /* set up to look for new status */
      /* traverse vertices to process new leaves */
      for (index = 0; index < number_of_vertices; index++)
         { if (position[index]) continue; already processed */
           if (leaf[index]) /* is now a leaf; assign it a position */
              { position[index] = ++count; /* must be non-zero, is position plus one */
                /* NOTE 2, NOTE 4 */
                new = 1; /* this one is newly a leaf */
              }
           else    /* is still not a leaf */
              { more_vertices = 1; /* found some more to process */
                leaf[index] = 1; /* reset for next pass */
              }
         }
      if (more_vertices && !new)
         { printf("***Found recursion. Vertices in the cycle and their parents: ");
           for (index = 0; index < number_of_vertices; index++)
              if (position[index] == 0) printf("%d ,index);
           return(1);
         }
    }
  /* then generate processing order from position */
     /* construct inverse mapping and adjust for offset */
  for (index = 0, index < number_of_vertices; index++)
     order[position[index]-1] = index, /* NOTE 3, NOTE 4 */
  free (position);
  return(0),
}
```

NOTES:

(1) If 'from' and 'to' are interchanged, the algorithm proceeds from the root(s) to leaves, instead of leaves to root(s).

(2) The reverse order could be achieved by counting down the 'count' variable instead of up.

(3) If the statement: order[position[number_of_vertices_index−1]−1]=index; is substituted, the processing order can be reversed.

(4) Position values are 1 through the number_of_vertices rather than 0 through number_of_vertices−1, so that value "0" is reserved to mean "unassigned".

Figure 4:
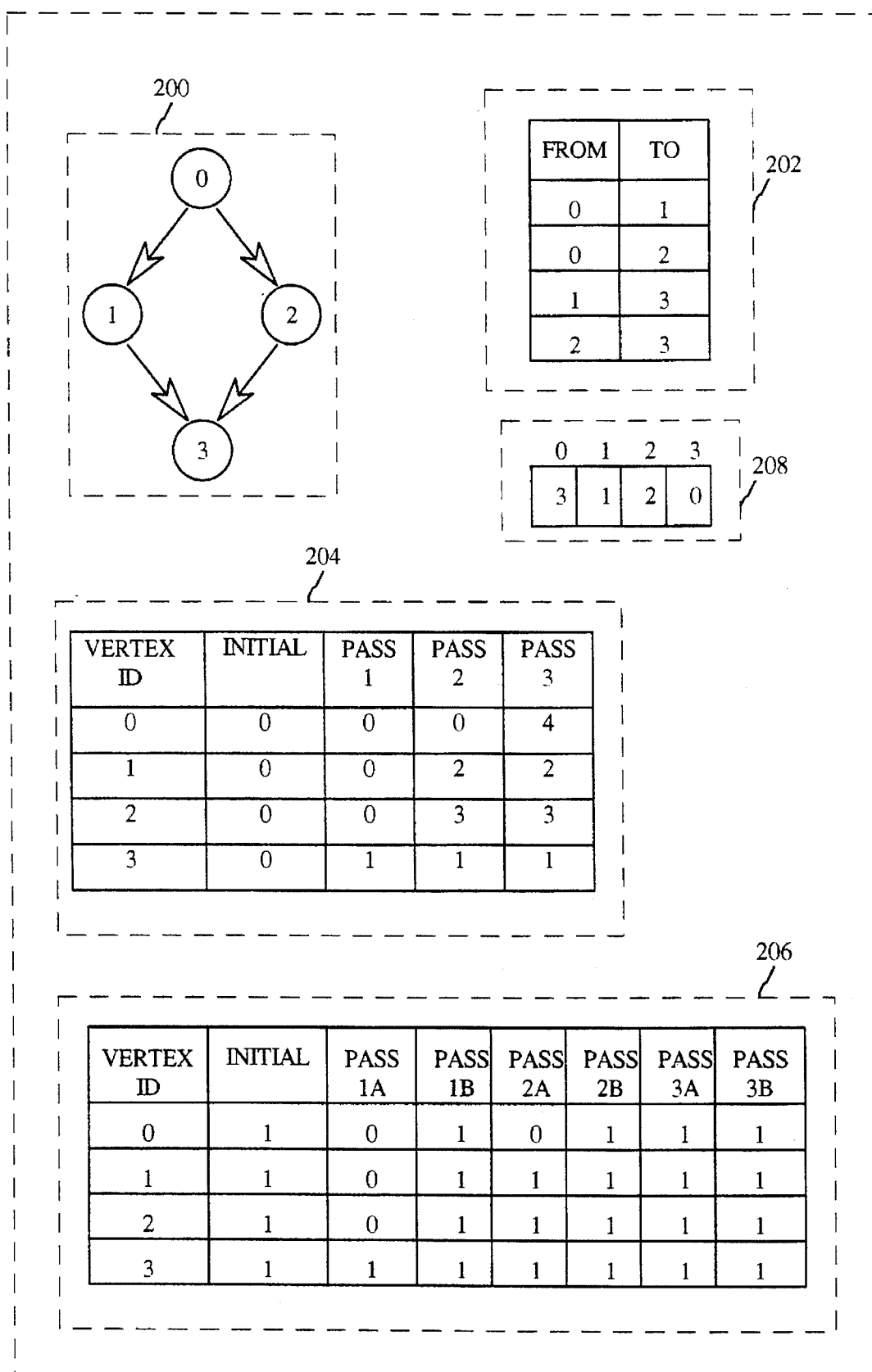
FIG. 4 is a diagram showing a sample directed graph and the contents of various data structures as used by the present invention.

FIG. 4 is a diagram showing a sample directed graph and the contents of various data structures as used by the present invention. The simple directed graph 200 shown in FIG. 4 has four vertices labeled 0, 1, 2, and 3, respectively. The direction of the inclusion relationship is shown by the arrows (arcs). Vertex 0 is a parent of Vertex 1 and Vertex 2. Vertex 1 is a parent of Vertex 3. Vertex 2 is also a parent of Vertex 3. In this simple example, Vertex 0 is a root vertex. In the field of logic design, this directed graph can be interpreted to represent a logic module denoted by Vertex 0, which, in turn, contains two elements. These two elements are represented as Vertex 1 and Vertex 2. Each of these two elements contains a third element, denoted Vertex 3. An Adjacency List 202 is constructed to represent the relationships between the vertices. The Adjacency List 202 has four entries, one for each arc in the sample directed graph. Each entry in the Adjacency List 202 has a From field and a To field. These two fields specify the beginning vertex and the ending vertex of each arc in the directed graph. The Adjacency List 202 is used as an input parameter by the present invention.

The main data structures used by the present invention for the current example are also shown in FIG. 4. The Position array 204 has an entry for each vertex present in the directed graph. Again, in the sample directed graph there are four vertices. Each entry in the Position array indicates the processing position, relative to the other vertices, of its corresponding vertex. Initially, all entries have a value of zero, indicating that a position has not been assigned to the vertices. The Leaf array 206 also has an entry for each vertex present in the directed graph. Each entry in the Leaf array indicates whether the corresponding vertex is currently marked as a leaf vertex (having a value of one). Initially, each vertex is marked as a leaf vertex. In conjunction with the steps shown above in Table I, one skilled in the art will recognize how the vertices in the directed graph are processed by the steps shown to arrive at a preferred processing order while also detecting the existence of any cycles.

A "pass" through the directed graph has been made each time the steps of the "while" loop shown in Table I are performed. The steps of the "while" loop produce the changes in the Position array 204 for each pass (e.g., Pass 1, Pass 2, and Pass 3) as shown in FIG. 4. Processing of the steps referenced by the "A" and "B" sections of Table I produce the changes in the Leaf array 206 for that portion of each pass (e.g. Pass 1A and Pass 1B of Pass 1, etc.). After executing the steps of Pass 1A, all arcs whose To vertex is marked as unassigned (that is, its Position entry is still zero) are flagged as a non-leaf (zero) in the Leaf array 206. Thus, in Pass 1A, it is detected that Vertex 3 is a leaf vertex. This fact is represented in the Leaf array as a one in the corresponding entry for Vertex 3. During the execution of the steps of Pass 1B, Vertex 3 is assigned a position because it is recognized as a leaf vertex. Thus, the current position is incremented and the vertex's corresponding entry in the Position array 204 is set to the current position (in this case, one). Vertex 3 is no longer considered for processing by the steps of the "while" loop shown in Table I, but the remaining vertices are re-initialized as leaf vertices. Therefore, the contents of the Leaf array 206 after Pass 1B show that all vertices are marked as leaves.

After executing Pass 2A, it is detected that Vertex 1 and Vertex 2 are leaf vertices. During the execution of the steps of Pass 2B, Vertex 1 is assigned a position because it is recognized as a leaf vertex. Thus, the current position is incremented and the corresponding entry in the Position array 204 is set to the current position (now, two). Similarly, Vertex 2 is assigned a position because it also is recognized as a leaf vertex. Thus, the current position is incremented and the corresponding entry in the Position array 204 is set to the current position (now, three). Vertex 1 and Vertex 2 are no longer considered for processing by the steps of the "while" loop shown in Table I, but the remaining vertex, Vertex 0, is re-initialized as a leaf vertex. Finally, in Pass 3A, Vertex 0 is recognized as a leaf vertex. During the execution of Pass 3B, Vertex 0 is assigned a position. Thus, the current position is incremented and the corresponding entry in the Position array 204 is set to the current position (now, four). After processing Pass 3, no unassigned vertices remain, so the steps of the "while" loop of Table I cease to be performed. The Order array 208 is then constructed from the Position array 204. By reordering the contents of the Position array 204 after Pass 3, the preferred processing order of vertices is stored in the Order array 208 as shown. By reading the Order array 208 left to right (i.e., 3, then 1, then 2, then 0), a preferred processing order may be used by other software modules.

Figures 5A, 5B:
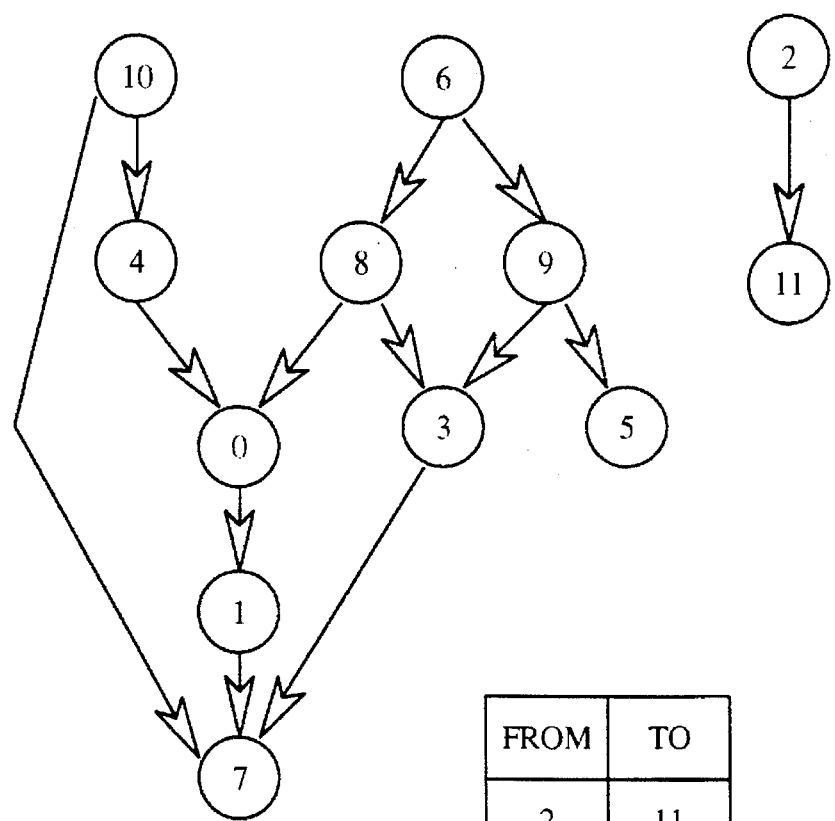
FIG. 5A is a diagram showing another example of a directed graph.
FIG. 5B is a table showing the contents of the Adjacency List for the directed graph of FIG. 5A.

FIG. 5A is a diagram showing another example of a directed graph. This directed graph is more complex than the simple graph shown in FIG. 4. It shows how vertices of the graph may be grouped in disjoint sets. For example, Vertex 2 and Vertex 11 are not currently connected to the rest of the vertices of the graph. There is no one root vertex in this graph. Note also that the arc from Vertex 10 to Vertex 7 is at a different level of the directed graph than many other arcs. FIG. 5B is a table showing the contents of the Adjacency List for the directed graph of FIG. 5A. Note that the arcs are not shown in the Adjacency List in a top-down or bottom-up order. However, the present invention easily handles these variations in graph structure. FIG. 6 is a table illustrating changes in the contents of the Position array during the processing of the directed graph of FIG. 5A according to the present invention. Initially, all vertices are unassigned and shown with a value of zero. Since the maximum path length of the directed graph is five (i.e., it consists of the vertex path $10 \rightarrow 4 \rightarrow 0 \rightarrow 1 \rightarrow 7$), five passes through the "while" loop shown in Table I are required. FIG. 7A is a table illustrating changes in the contents of the Leaf array during the processing of the directed graph of FIG. 5A according to the present invention. FIG. 7B is a table illustrating the preferred processing order of the directed graph of FIG. 5A as a result of the present invention. Again, by reading this Order array left to right, a preferred processing order may be used by other software modules. Based on the description of the processing performed for the directed graph shown in FIG. 4 and the processing steps outlined in Table I, one skilled in the art can verify the correctness with which the present invention arrives at the preferred processing order shown in FIG. 7B.

The primary advantage of the disclosed method is its speed when operating on large amounts of data. One skilled in the art of analyzing computational complexity can readily ascertain that the time spent processing the directed graph is bounded by the length of its longest path. Two loops are contained in the method, one traversing the arcs and one traversing the vertices. The computational complexity of the present invention is therefore $O(n)$ (where n is the number of arcs), rather than $O(n2)$ as in previous methods. This difference in computational complexity has a dramatic effect on processing time. In a typical CAE logic hierarchy containing approximately 10,000 arcs, 1,300 vertices, and a longest path value of 10, processing of an $O(n2)$ algorithm on a sample computer system requires on the order of several minutes to arrive at a processing order and detect any cycles. The sample implementation of the present invention, as disclosed in the Appendix and executing on the same computer system, requires only a fraction of a second to generate the desired information. One skilled in the art will appreciate the great improvement in processing time for logic hierarchies containing many thousands of vertices and tens of thousands of arcs that the present invention provides.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

I claim:

1. A computer-implemented method for generating a processing order and for detecting cycles in a directed graph having an array of vertices and an array of arcs connecting pairs of vertices, wherein the array of vertices and the array of arcs may be randomly-ordered, and wherein vertices represent components in a system and arcs represent a logical relationship between the components in the system, each arc being defined by a starting vertex and an ending vertex, each vertex being assigned or unassigned to a processing order array and being electronically marked as a leaf vertex or a non-leaf vertex, the computer-implemented method comprising the steps of:

(a) electronically marking each vertex as a leaf vertex in the array of vertices;

(b) electronically marking each vertex as having an unassigned processing order;

(c) electronically traversing the array of arcs and electronically marking the starting vertex as a non-leaf vertex for each arc whose ending vertex is unassigned to the processing order array;

(d) electronically traversing the array of vertices and for each vertex that is yet unassigned to the processing order array and electronically marked as a leaf vertex, electronically assigning the vertex to the processing order array, and for each vertex that is unassigned to the processing order array and electronically marked as a non-leaf vertex, electronically marking the vertex as a leaf vertex;

(e) electronically indicating that a cycle exists in the directed graph when there are unassigned vertices remaining in the array of vertices and no vertices were assigned to the processing order array during said step (d); and (f) repeating said steps (c)–(e) if there are vertices in the array of vertices that are unassigned to the processing order array and no cycle was indicated in said step (e).

2. The computer-implemented method of claim 1, wherein the array of arcs is represented as an adjacency list.

3. The computer-implemented method of claim 1, wherein the logical relationship represented by arcs is the physical inclusion of one component by another component.

4. The computer-implemented method of claim 3, wherein the components are electronic devices.

5. The computer-implemented method of claim 4, wherein said electronic devices are very large scale integrated (VLSI) circuit devices.

6. A method for operating a digital computer to generate a processing order array and to detect cycles in a directed graph having an array of vertices and an array of arcs connecting pairs of vertices, each arc being defined by a starting vertex and an ending vertex, wherein the array of vertices and the array of arcs may be randomly-ordered, and wherein each vertex represents a component in a system and each arc represents a logical relationship between a plurality of components in the system, each vertex being assigned or unassigned to the processing order array and being electronically marked as a leaf vertex or a non-leaf vertex, comprising the steps of operating a computer to:

(a) initialize each vertex in the array of vertices to be unassigned to the processing order array;

(b) electronically mark each vertex in the array of vertices as a leaf vertex;

(c) traverse the array of arcs and electronically mark the starting vertex as a non-leaf vertex for each arc having an ending vertex that is unassigned to the processing order array;

(d) traverse the array of vertices and for each vertex that is unassigned to the processing order array and electronically marked as a leaf vertex, assign the vertex to the processing order array, and for each vertex that is unassigned to the processing order array and electronically marked as a non-leaf vertex, electronically mark the vertex as a leaf vertex;

(e) indicate that a cycle exists in the directed graph when there are unassigned vertices remaining in the array of vertices and no vertices were assigned to the processing order array during said step (d); and (f) repeat said steps (c)–(e) if there are vertices in the array of vertices that are unassigned to the processing order array and no cycle was indicated in said step (e).

7. The method of claim 6, wherein the logical relationship represented by each arc is the physical inclusion of one component by another component.

8. The method of claim 7, wherein the components are electronic devices.

9. The method of claim 8, wherein said electronic devices are very large scale integrated (VLSI) circuit devices.

10. A computer-implemented method for generating a processing order and for detecting cycles in a directed graph having an array of vertices and an array of arcs connecting pairs of vertices, wherein the array of vertices and the array of arcs may be randomly-ordered, and wherein each vertex represents a component in a system and each arc represents a logical relationship between a plurality of components in the system, each arc being defined by a starting vertex and an ending vertex, each vertex being assigned or unassigned to a position in a preliminary processing order array and being electronically marked as a leaf vertex or a non-leaf vertex, a parent vertex being the starting vertex and a corresponding child vertex being the ending vertex for any arc, comprising the steps of:

(a) initializing a next available position in the preliminary processing order array to the first position in the preliminary processing order array;

(b) initializing each vertex in the array of vertices to be unassigned to any position in the preliminary processing order array;

(c) electronically marking each vertex in the array of vertices as a leaf vertex;

(d) traversing the array of arcs and electronically marking the starting vertex as a non-leaf vertex for each arc whose ending vertex is unassigned to any position in the preliminary processing order array;

(e) traversing the array of vertices and for each vertex that is unassigned to any position in the preliminary processing order array and electronically marked as a leaf vertex, incrementing said next available position and assigning the vertex to said next available position in the preliminary processing order array, and for each vertex that is unassigned to any position in the preliminary processing order array and electronically marked as a non-leaf vertex, electronically marking the vertex as a leaf vertex;

(f) indicating that a cycle exists in the directed graph when there are unassigned vertices remaining in the array of vertices and no vertices were assigned positions in the preliminary processing order array during said step (e);

(g) repeating said steps (d)–(f) if there are vertices in the array of vertices that are unassigned to any positions in the preliminary processing order array and no cycle was indicated in said step (f); and (h) generating a final processing order array from the positions of the vertices in the preliminary processing order array such that each vertex in the array of vertices will be processed in a predetermined order.

11. The computer-implemented method of claim 10, wherein said generating a final processing order array step (h) generates said final processing order array from the positions of the vertices in the preliminary processing order array such that for each arc, each parent vertex in the array of vertices will be processed according to said final processing order array before a corresponding child vertex.

12. An apparatus for producing a processing order for the components in a system and for detecting recursion in the system definition, the components being represented as vertices in a directed graph, the arcs of the directed graph representing a logical relationship between selected vertices, each arc being defined by a starting vertex and an ending vertex, each vertex being assigned or unassigned to a processing order array and being marked as a leaf vertex or a non-leaf vertex, the directed graph being input to the apparatus, the apparatus comprising:

initialization means for electronically marking each vertex as a leaf vertex which is not assigned a processing order in the processor order array;

arc traversal means for traversing an array of arcs and for electronically marking the starting vertex as a non-leaf vertex for each arc whose ending vertex is unassigned to the processing order array;

vertex traversal means for traversing an array of vertices and for each vertex that is unassigned to the processing order array and electronically marked as a leaf vertex, assigning that vertex to the processing order array to establish the processing order for the components in the system, and for each vertex that is unassigned to the processing order array and electronically marked as a non-leaf vertex, electronically marking that vertex as a leaf vertex in said array of vertices; and recursion detection means for detecting that recursion exists in the system when there are unassigned vertices remaining in said array of vertices and no vertices were assigned to the processing order array by said vertex traversal means.

13. The apparatus of claim 12, wherein said array of arcs is represented as an adjacency list and stored in a computer memory.

14. The apparatus of claim 12, wherein said apparatus is embedded in a computer aided engineering (CAE) system for specifying, analyzing, and verifying the design of electronic devices.

15. An apparatus for producing a processing order for the components in a system and for detecting recursion in the system definition, the components being represented as vertices in a directed graph, the arcs of the directed graph representing a logical relationship between selected vertices, each arc being defined by a starting vertex and an ending vertex, each vertex being assigned or unassigned to a processing order array and being electronically marked as a leaf vertex or a non-leaf vertex, the directed graph being input to the apparatus, the apparatus comprising:

initialization means for initially marking each vertex as a leaf vertex which is unassigned to the processing order array;

arc traversal means for traversing an array of arcs and for electronically marking the starting vertex as a non-leaf vertex for each arc having an ending vertex that is unassigned to the processing order array;

vertex traversal means for traversing an array of vertices and for each vertex that is unassigned to the processing order array and electronically marked as a leaf vertex, assigning the vertex to the processing order array whereby the processing order is established for the components in the system, and for each vertex that is unassigned to the processing order array and electronically marked as a non-leaf vertex, electronically marking the vertex as a leaf vertex; and recursion detection means coupled to said arc traversal means and said vertex traversal means for detecting that recursion exists in the system when there are unassigned vertices remaining in said array of vertices and no vertices were assigned to the processing order array by said vertex traversal means.

16. The computer-implemented method of claim 10, wherein said generating a final processing order array step (h) generates said final processing order array from the positions of the vertices in the preliminary processing order array such that for each arc, each child vertex in the array of vertices will be processed according to said final processing order array before the corresponding parent vertex.

17. For use with a data base storing representations of electronic components, selected hierarchical ones of the electronic components being defined as an interconnection of one or more associated ones of the electronic components, wherein each of the selected hierarchical ones of the electronic components is defined as a parent component and each of the associated ones of the electronic components is defined as an associated child component, the data base further storing a representation of a circuit design comprising the interconnection of included ones of the electronic components, a method for determining a final predetermined processing order of the included ones of the electronic components and for determining whether a recursion exists wherein an included one of the electronic components is a selected hierarchical one of the electronic components defined as a circuit design containing that selected hierarchical one of the electronic components, comprising the steps of:

(a) designating each of the included ones of the electronic components as being an entry in an unordered list of components and having a first predetermined designation indicative of not being a selected hierarchical one of the electronic components;

(b) marking each of the parent components in said unordered list of components with a second predetermined designation if the parent component in said unordered list of components has an associated child component in said unordered list of components, said second predetermined designation indicative of said marked parent component being defined as an interconnection of one or more other ones of the electronic components in said unordered list of components;

(c) assigning each component in said unordered list of components which is designated with said first predetermined designation to a processing order, and removing said component from said unordered list of components;

(d) assigning said first predetermined designation to each component in said unordered list which is designated with said second predetermined designation;

(e) indicating that a recursion exists if components remain in said unordered list of components and no component was assigned to said processing order in said step (c);

(f) repeating said steps (b) through (e) if there are components in said unordered list of components and no recursion was indicated in said step (e);

(g) generating the final predetermined processing order from said processing order.

18. The method of claim 17, wherein said generating step (g) generates the final predetermined processing order such that each of the associated child components is processed before the associated parent component.

19. The method of claim 17, wherein said generating step (g) generates the final predetermined processing order such that each of the parent components is processed before an associated child component.

20. For use with a data base storing representations of electronic components, selected hierarchical ones of the electronic components being defined as an interconnection of one or more associated ones of the electronic components, wherein each of the selected hierarchical ones of the electronic components is defined as a parent component and each of the associated ones of the electronic components is defined as an associated child component, the data base further storing a representation of a hierarchical circuit design comprising the interconnection of included ones of the electronic components, an apparatus for determining a final predetermined processing order of the included ones of the electronic components and for determining whether a recursion exists wherein an included one of the electronic components is a selected hierarchical one of the electronic components defined as a circuit design containing that selected hierarchical one of the electronic components, the apparatus comprising:

initialization means for designating each of the included ones of the electronic components as being an entry in an unordered list of components and as having a first predetermined designation indicative of said designated electronic component not being one of the selected hierarchical ones of the electronic components;

first processing means for designating each of the parent components in said unordered list of components with a second predetermined designation if the parent component in said unordered list of components has an associated child component in said unordered list of components;

second processing means for assigning each component in said unordered list of components which is designated with said first predetermined designation to a processing order, and removing said assigned component from said unordered list of components, and for further assigning said first predetermined designation to each component in said unordered list which is designated with said second predetermined designation; and recursion detection means for detecting that a recursion exists if components remain in said unordered list of components and no component was assigned to said processing order by said second processing means.

21. The apparatus of claim 20, and further including a processing order generating means for generating a final processing order from said processing order.

22. The apparatus of claim 21, wherein said processing order generating means generates the final predetermined processing order such that each of the associated child components is processed before the associated parent component.

23. The apparatus of claim 21, wherein said processing order generating means generates the final predetermined processing order such that each of the parent components is processed before an associated child component.

* * * * *